(12) United States Patent
Wietfeldt et al.

(10) Patent No.: US 8,750,178 B2
(45) Date of Patent: Jun. 10, 2014

(54) CONNECTION MANAGER FOR A WIRELESS COMMUNICATION DEVICE

(75) Inventors: Richard D. Wietfeldt, San Diego, CA (US); Dongan Zhang, Plano, TX (US)

(73) Assignee: QUALCOMM Incorporated, San Diego, CA (US)

(*) Notice: Subject to any disclaimer, the term of this patent is extended or adjusted under 35 U.S.C. 154(b) by 175 days.

(21) Appl. No.: 12/635,305

(22) Filed: Dec. 10, 2009

(65) Prior Publication Data

US 2010/0302958 A1 Dec. 2, 2010

Related U.S. Application Data

(60) Provisional application No. 61/182,986, filed on Jun. 1, 2009.

(51) Int. Cl.
*H04B 7/00* (2006.01)

(52) U.S. Cl.
USPC .................. 370/310; 455/553.1; 709/250

(58) Field of Classification Search
USPC ......... 370/310, 322, 325, 339–341, 348, 431, 370/463, 329; 709/225–226, 250; 455/82, 455/83, 550.1, 553.1, 562.1, 575.1, 575.7
See application file for complete search history.

(56) References Cited

U.S. PATENT DOCUMENTS

| | | | |
|---|---|---|---|
| 6,381,631 B1 * | 4/2002 | van Hoff ........................ | 709/225 |
| 6,600,934 B1 * | 7/2003 | Yun et al. ..................... | 455/562.1 |
| 7,006,810 B1 * | 2/2006 | Winters et al. .............. | 455/562.1 |
| 7,324,462 B1 * | 1/2008 | Page et al. ..................... | 370/255 |
| 7,447,779 B2 * | 11/2008 | Fujii ............................. | 709/227 |
| 7,623,879 B2 * | 11/2009 | Honkanen et al. ............ | 370/310 |
| 8,190,191 B2 * | 5/2012 | Livet et al. .................. | 455/550.1 |
| 2002/0007407 A1 * | 1/2002 | Klein ............................. | 709/225 |
| 2003/0026222 A1 | 2/2003 | Kotzin | |

(Continued)

FOREIGN PATENT DOCUMENTS

| | | |
|---|---|---|
| CN | 101088235 A | 12/2007 |
| CN | 101142769 A | 3/2008 |

(Continued)

OTHER PUBLICATIONS

International Search Report and Written Opinion—PCT/US2010/036858, International Search Authority—European Patent Office—Feb. 17, 2011.

(Continued)

*Primary Examiner* — Jeffrey M Rutkowski
(74) *Attorney, Agent, or Firm* — Rupit M. Patel

(57) ABSTRACT

Techniques for supporting communication for a wireless device are described. In an aspect, an embedded connection manager may reside within a radio subsystem and support communication for the wireless device. The connection manager may receive at least one connection request sent by at least one application, select at least one radio for use, and provide the selected radio(s) to the application(s). In another aspect, communication may be supported using multiple radios. M out of N available radios may be selected for use, and K applications may be mapped to the M selected radios, where M>1, N>1, and K≥1. In yet another aspect, communication may be supported using profiles, which may define the operation of the wireless device to obtain connectivity. In yet another aspect, communication may be supported with auxiliary services, which are services that assist the wireless device to obtain connectivity.

19 Claims, 12 Drawing Sheets

(56) References Cited

U.S. PATENT DOCUMENTS

| | | | |
|---|---|---|---|
| 2003/0193910 A1 | 10/2003 | Shoaib et al. | |
| 2004/0131078 A1 | 7/2004 | Gupta et al. | |
| 2004/0204175 A1* | 10/2004 | Karaoguz et al. | 455/550.1 |
| 2004/0264372 A1* | 12/2004 | Huang | 370/310 |
| 2005/0083899 A1 | 4/2005 | Babbar et al. | |
| 2005/0136898 A1 | 6/2005 | Shaheen et al. | |
| 2005/0239497 A1 | 10/2005 | Bahl et al. | |
| 2006/0166668 A1 | 7/2006 | Choi et al. | |
| 2006/0193295 A1 | 8/2006 | White et al. | |
| 2006/0209821 A1* | 9/2006 | Jung et al. | 709/250 |
| 2007/0049329 A1* | 3/2007 | Mayer et al. | 455/552.1 |
| 2007/0073887 A1 | 3/2007 | Prasad et al. | |
| 2008/0081559 A1 | 4/2008 | Parikh et al. | |
| 2008/0081606 A1* | 4/2008 | Cole | 455/424 |
| 2008/0205386 A1* | 8/2008 | Purnadi et al. | 370/389 |
| 2008/0275992 A1* | 11/2008 | Basty et al. | 709/227 |
| 2008/0304510 A1* | 12/2008 | Qu | 370/463 |
| 2009/0031282 A1 | 1/2009 | Ko | |
| 2010/0303008 A1 | 12/2010 | Wietfeldt et al. | |
| 2011/0199947 A1* | 8/2011 | Strobl et al. | 370/310 |
| 2011/0199989 A1* | 8/2011 | Wietfeldt et al. | 370/329 |

FOREIGN PATENT DOCUMENTS

| | | |
|---|---|---|
| EP | 1589781 | 10/2005 |
| EP | 2187675 A1 | 5/2010 |
| JP | 2005328520 A | 11/2005 |
| WO | WO0101712 A1 | 3/2001 |
| WO | WO2005053338 | 6/2005 |
| WO | WO2005064872 | 7/2005 |
| WO | WO2006055784 A2 | 5/2006 |
| WO | WO2007021951 A2 | 2/2007 |
| WO | WO2007096884 A2 | 8/2007 |
| WO | WO2008011420 A1 | 1/2008 |
| WO | WO2008024630 A2 | 2/2008 |
| WO | WO2009031282 A1 | 3/2009 |
| WO | WO2010045652 | 4/2010 |

OTHER PUBLICATIONS

Partial International Search Report—PCT/US2010/036867—International Search Authority, European Patent Office, Oct. 25, 2010.

* cited by examiner

CONNECTION MANAGER FOR A WIRELESS COMMUNICATION DEVICE

The present application claims priority to provisional U.S. Application Ser. No. 61/182,986, entitled "Multi-radio connection manager framework," filed Jun. 1, 2009, assigned to the assignee hereof and incorporated herein by reference.

BACKGROUND

I. Field

The present disclosure relates generally to communication, and more specifically to techniques for supporting communication for a wireless communication device.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication device may include a number of radios to support communication with different wireless communication networks. The wireless device may also support a number of applications, which may provide different communication services and may have different requirements. It may be desirable to support communication for active applications on the wireless device such that good performance can be achieved.

SUMMARY

Techniques for supporting communication for a wireless device are described herein. In an aspect, an embedded connection manager may reside within a radio subsystem of the wireless device and may support communication for the wireless device. The radio subsystem may be a modem, a modem chipset, a wireless modem card, or some other unit or module that supports radio communication. In one design, the connection manager may communicate with at least one application via a host interface and may receive at least one connection request from the application(s). The connection manager may then select at least one radio to use for the application(s), e.g., based on the capabilities of the available radios and the requirements of the application(s). The connection manager may provide the selected radio(s) to the application(s).

In another aspect, communication for the wireless device may be supported using multiple radios. In one design, N radios available for use on the wireless device may be determined, where N>1. M out of the N available radios may be selected for use, where M>1. K applications may be mapped to the M selected radios, where K≥1. Each application may communicate via one or more radios for that application. S service clients may also be mapped to the M selected radios, where S≥1. Each service client may communicate with an associated service server via an associated radio to provide connectivity for the wireless device, as described below.

In yet another aspect, communication for the wireless device may be supported using profiles. Each profile may define the operation of the wireless device to obtain connectivity. In one design, Q profiles stored on the wireless device may be determined, where Q>1. P out of the Q profiles may be selected for use, where P≥1. Operating rules may be generated based on the P selected profiles. At least one application may be mapped to at least one radio based on the operating rules.

In yet another aspect, communication for the wireless device may be supported with auxiliary services, which are services that assist the wireless device to obtain connectivity. In one design, a service server residing in a network may obtain device information for the wireless device. The device information may comprise the location of the wireless device, the capabilities of the wireless device, etc. The service server may also obtain network information for at least one wireless network. The network information may comprise the cost of each wireless network, the availability of each wireless network, etc. The service server may determine connectivity information for the wireless device based on the device information and the network information. The connectivity information may indicate one or more wireless networks selected for the wireless device, authentication information used to access the selected wireless network(s), etc. The service server may send the connectivity information to the wireless device for use by the wireless device to obtain connectivity.

In one design, a service client residing on the wireless device may send a request for connectivity information to the service server. The service client may thereafter receive the connectivity information from the service server and may connect to a wireless network based on the connectivity information.

Various aspects and features of the disclosure are described in further detail below.

DETAILED DESCRIPTION

Figure 1:
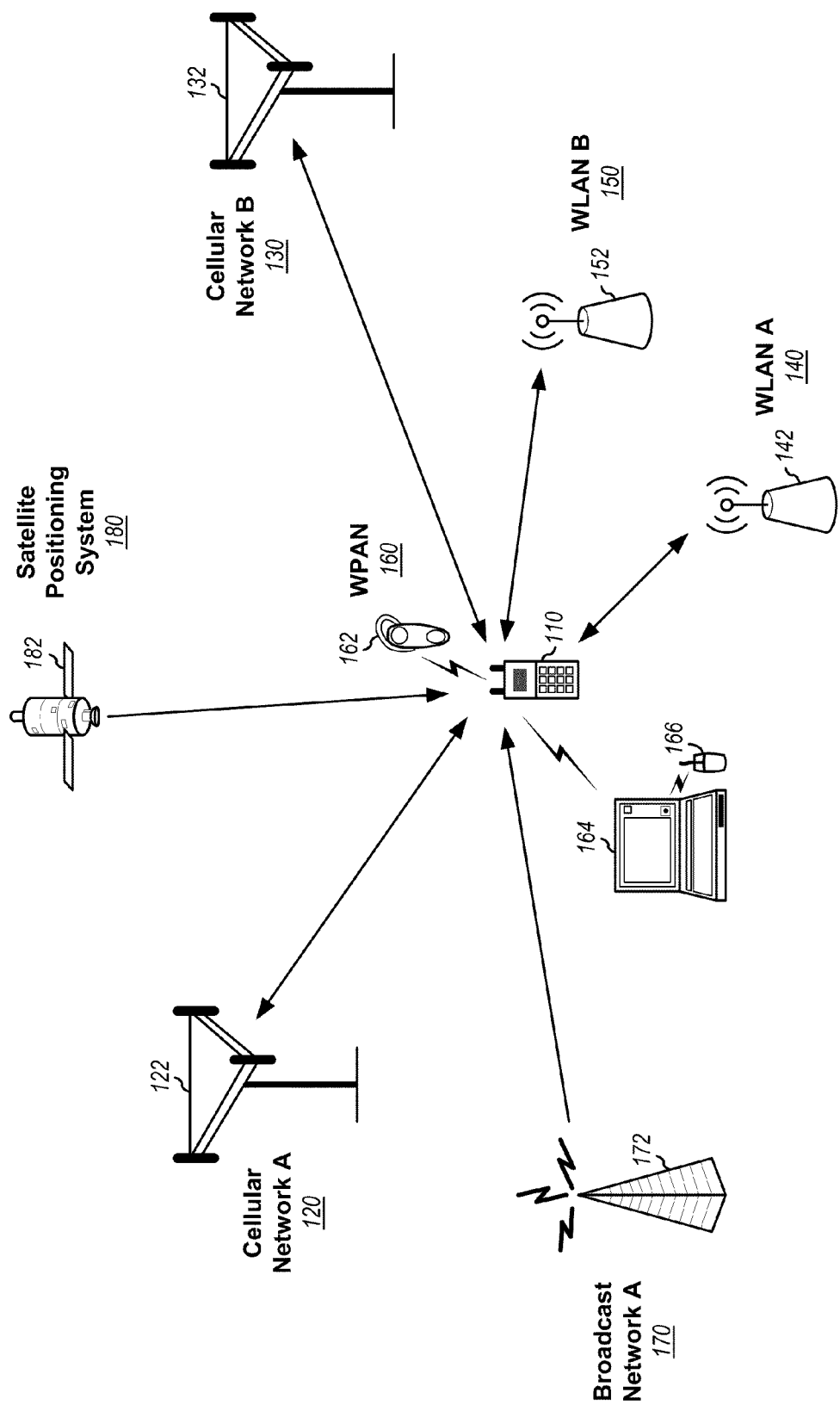
FIG. 1 shows a wireless device communicating with various systems.

FIG. 1 shows a wireless communication device 110 capable of communicating with multiple wireless communication networks. These wireless networks may include one or more wireless wide area networks (WWANs) 120 and 130, one or more wireless local area networks (WLANs) 140 and 150, one or more wireless personal area networks (WPANs) 160, one or more broadcast networks 170, one or more satellite positioning systems 180, other networks and systems not shown in FIG. 1, or any combination thereof. The terms "network" and "system" are often used interchangeably. The WWANs may be cellular networks.

Cellular networks 120 and 130 may each be a CDMA, TDMA, FDMA, OFDMA, SC-FDMA, or some other network. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95, and IS-856 standards. IS-2000 is also referred to as CDMA 1X, and IS-856 is also referred to as Evolution-Data Optimized (EVDO). A TDMA network may implement a radio technology such as Global System for Mobile Communications (GSM), Digital Advanced Mobile Phone System (D-AMPS), etc. An OFDMA network may implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). Cellular network 120 may include a number of base stations 122 that can support bi-directional communication for wireless devices within their coverage. Similarly, cellular network 130 may include a number of base stations 132 that can support bi-directional communication for wireless devices within their coverage.

WLANs 140 and 150 may each implement a radio technology such as IEEE 802.11 (Wi-Fi), Hiperlan, etc. WLAN 140 may include one or more access points 142 that can support bi-directional communication. Similarly, WLAN 150 may include one or more access points 152 that can support bi-directional communication. WPAN 160 may implement a radio technology such as Bluetooth, IEEE 802.15, etc. WPAN 160 may support bi-directional communication for various devices such as wireless device 110, a headset 162, a computer 164, a mouse 166, etc.

Broadcast network 170 may be a television (TV) broadcast network, a frequency modulation (FM) broadcast network, a digital broadcast network, etc. A digital broadcast network may implement a radio technology such as MediaFLO™ Digital Video Broadcasting for Handhelds (DVB-H), Integrated Services Digital Broadcasting for Terrestrial Television Broadcasting (ISDB-T), Advanced Television Systems Committee-Mobile/Handheld (ATSC-M/H), etc. Broadcast network 170 may include one or more broadcast stations 172 that can support one-way communication.

Satellite positioning system 180 may be the United States Global Positioning System (GPS), the European Galileo system, the Russian GLONASS system, the Quasi-Zenith Satellite System (QZSS) over Japan, the Indian Regional Navigational Satellite System (IRNSS) over India, the Beidou system over China, etc. Satellite positioning system 180 may include a number of satellites 182 that transmit signals used for positioning.

Wireless device 110 may be stationary or mobile and may also be referred to as a user equipment (UE), a mobile station, a mobile equipment, a terminal, an access terminal, a subscriber unit, a station, etc. Wireless device 110 may be a cellular phone, a personal digital assistant (PDA), a wireless modem, a handheld device, a laptop computer, a cordless phone, a wireless local loop (WLL) station, a broadcast receiver, etc. Wireless device 110 may communicate two-way with cellular networks 120 and/or 130, WLANs 140 and/or 150, devices within WPAN 160, etc. Wireless device 110 may also receive signals from broadcast network 170, satellite positioning system 180, etc. In general, wireless device 110 may communicate with any number of networks and systems at any given moment.

Figure 2:
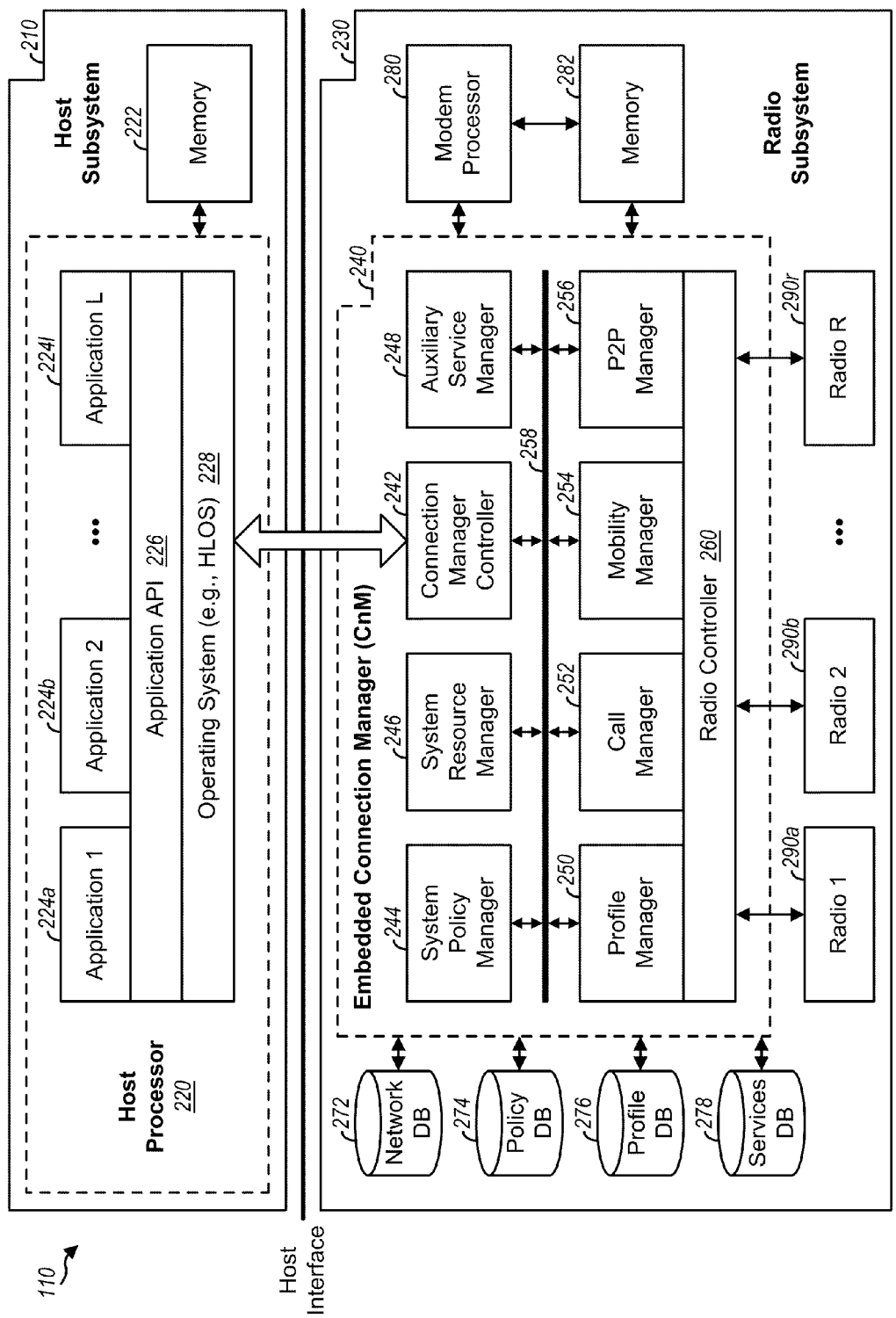
FIG. 2 shows a block diagram of the wireless device.

FIG. 2 shows a block diagram of a design of wireless device 110, which includes a host subsystem 210 and a radio subsystem 230. In the design shown in FIG. 2, host subsystem 210 includes a host processor 220 and a memory 222. Wireless device 110 may support L applications 224a through 224l, which may provide different communication services such as voice, packet data, video share, video telephony, email, broadcast reception, instant messaging, push-to-talk, etc. In general, L may be any value. Any of the L applications 224 may be active at any given moment. An application programming interface (API) 226 may support communication between applications 224 and an operating system (OS) 228 for wireless device 110. Operating system 228 may control the operation of wireless device 110 and may be a high level operating system (HLOS) or some other operating system. Host processor 220 may execute the active applications and may also run the API and the operating system. Memory 222 may store program codes and data for host processor 220.

In the design shown in FIG. 2, radio subsystem 230 includes an embedded connection manager (CnM) 240, databases 272 to 278, a modem processor 280, a memory 282, and R radios 290a through 290r, where R may be any value. Radio subsystem 230 may be a modem chip, a modem chipset, a wireless data card, etc. The R radios 290 may be for 3GPP2 cellular networks (e.g., CDMA 1X, EVDO, etc.), 3GPP cellular networks (e.g., GSM, GPRS, EDGE, WCDMA, LTE, etc.), WLANs, WiMAX networks, GPS, Bluetooth, broadcast networks, Near Field Communication (NFC), Radio Frequency Identification (RFID), etc. Modem processor 280 may perform various functions such as processing for data being transmitted or received via radios 290. The processing for each radio 290 may be dependent on the radio technology supported by that radio and may include encoding, decoding, modulation, demodulation, encryption, decryption, etc. Memory 282 may store program codes and data for modem processor 280 and connection manager 240.

Connection manager 240 may perform various functions to support communication for active applications and services via available radios. Within connection manager 240, a connection manager (CnM) controller 242 may be responsible for the overall control of connection manager 240. CnM controller 242 may communicate with operating system 228 and host processor 220 via messages exchanged through a host interface, which may be common inter-processor communication (IPC). CnM controller 242 may determine which applications are active, obtain the requirements of the active applications, and provide information on the available or selected radios. CnM controller 242 may also coordinate the operation of other managers and controllers within connection manager 240, e.g., through messages exchanged via a common bus 258.

A system policy manager 244 may manage policies associated with the radios, activate and de-activate radios in response to events, and manage handoffs/handovers between wireless networks. The policies may be used to determine which radio(s) to use for any given application. A system resource manager 246 may interface with system policy manager 244 to perform resource management such as conflict resolution, power management, link quality of service (QoS), admission control, etc. An auxiliary service manager 248 may support clients/agents for auxiliary services, which are described below. Auxiliary service manager 248 may support a plug-in environment for introducing new clients of auxiliary services, which may simplify updating of technologies and features on wireless device 110.

A profile manager 250 may create, update, and prioritize profiles, which are described below. The profiles may indicate preferences for connectivity, as defined by various entities. Profile manager 250 may determine one or more applicable profiles for the current configuration and may generate operating rules based on the applicable profile(s). A call manager 252 may manage call, change phone settings, register/deregister supplementary services, and notify applications regarding call status, phone state/status, and service status. Call manager 252 may operate based on network operator rules, which may be provided via a preferred roaming list (PRL) in 3GPP2, a list of preferred public land mobile networks (PLMNs) in 3GPP, etc. A mobility manager 254 may manage service continuity using Mobile Internet Protocol (IP), neighbor channel measurements, better system detection, pre-authentication and security key exchange, and other functional units for voice and data services. A peer-to-peer (P2P) manager 256 may support peer-to-peer communication between wireless device 110 and other wireless devices with or without infrastructure, as described below. P2P manager 256 may enable peer-to-peer communication across wireless networks and sub-networks so that active applications can be unaware of intermediate nodes between the networks.

A radio controller 260 may interface with radios 290 and may control the operation of the radios. Radio controller 260 may be part of connection manager 240 (as shown in FIG. 2) or may be external to connection manager 240. Radio controller 260 may perform functions to support voice call continuity (VCC) and data call continuity (DCC). Radio controller 260 may also implement handoff mechanism for voice call continuity between a circuit-switched network and a packet-switched network. Radio controller 260 may also implement handoff mechanism for (i) data service continuity defined in 3GPP I-WLAN and (ii) Mobile IP defined in 3GPP and Internet Engineering Task Force (IETF). Radio controller 260 may support VCC and DCC functionalities for automatic system selection and in-call/in-use handoff between radios of different radio technologies in order to maintain good user experience.

A network database (DB) 272 may store information for different wireless networks such as a PRL, a preferred PLMN list, etc. A policy database 274 may store information that may be used to select radios to provide connectivity for wireless device 110. A profile database 276 may store profiles that may be used to obtain connectivity. A services database 278 may store service clients that have been downloaded onto wireless device 110. Other databases may also be used to store other types of information for wireless device 110.

FIG. 2 shows an exemplary design of connection manager 240 for wireless device 110. Connection manager 240 may also include fewer, different, and/or additional managers, controllers, and databases. In general, connection manager 240 may include (i) any number of managers and controllers for any number of functions and (ii) any number of databases for any type of information that may be useful to support communication.

1. Embedded Connection Manager

In an aspect, connection manager 240 may be embedded and may reside within radio subsystem 230, e.g., as shown in FIG. 2. Embedded connection manager 240 may be different from a conventional connection manager residing on an external host outside of a radio subsystem, as described below.

Figure 3A:
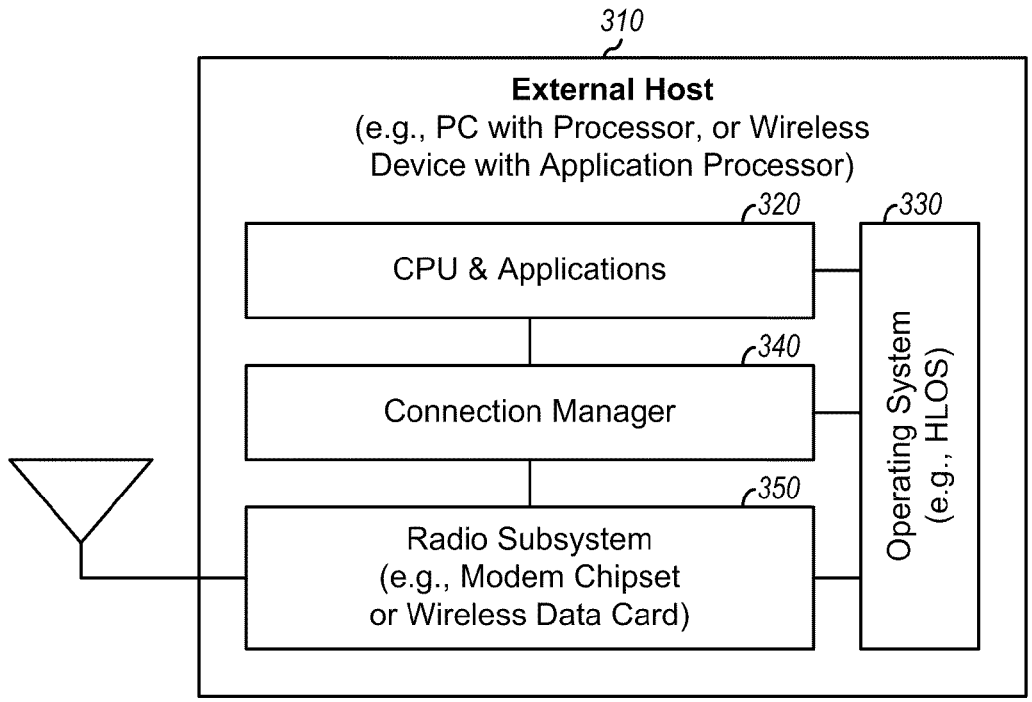
FIG. 3A shows a host with an external connection manager.

FIG. 3A shows an external host 310 that includes a central processing unit (CPU) and applications 320, an OS (e.g., Windows or HLOS) 330, a connection manager 340, and a radio subsystem 350. External host 310 may be (i) a personal computer (PC) running an OS/HLOS or (ii) a wireless device with an application processor running an HLOS. Connection manager 340 is external to radio subsystem 350 and may run as an application on external host 310. The CPU or application processor may control radio subsystem 350 via OS/HLOS 330.

Figure 3B:
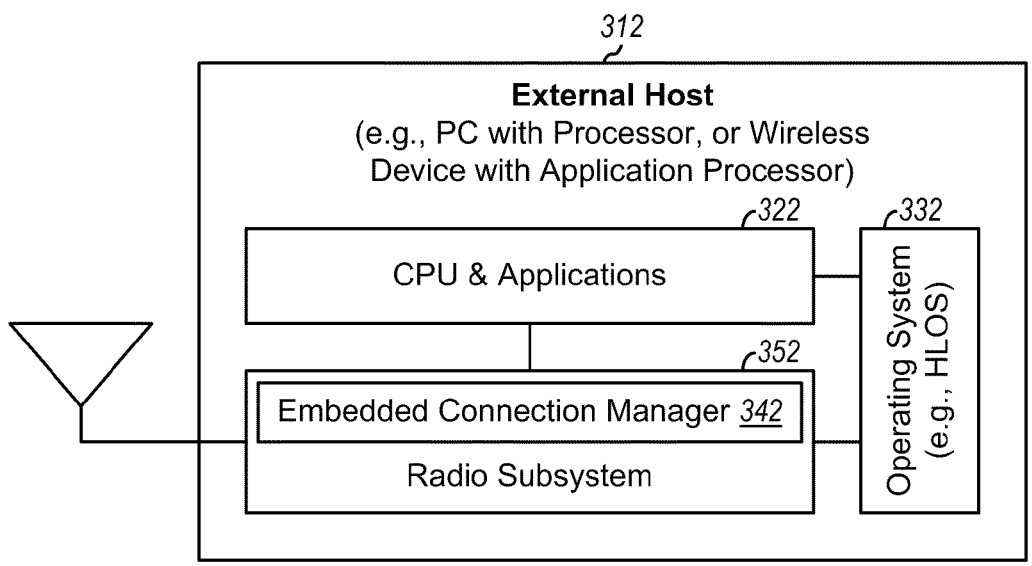
FIG. 3B shows a host with an embedded connection manager.

FIG. 3B shows an external host 312 with an embedded connection manager 342 within a radio subsystem 352. External host 312 may be (i) a PC running an OS/HLOS 332 interfacing to radio subsystem 352 or (ii) a wireless device with an application or host processor that interfaces to radio subsystem 352. Embedded connection manager 342 may control radio subsystem 352, may select radios independently of external host 312, and may control connection management and selection/handoff.

In general, an embedded connection manager, such as connection manager 240 in FIG. 2 or connection manager 342 in FIG. 3B, may reside in a radio subsystem and below the OS/HLOS. The radio subsystem does not include an OS/HLOS and further does not include an application that implements connection manager functionality or utilizes OS/HLOS functionality. The radio subsystem intrinsically or natively implements the embedded connection manager functionality, independent of any host entity that introduces an OS/HLOS, an applications environment, etc. This may simplify porting of the embedded connection manager across OS/HLOS. The embedded connection manager operates independently of the OS/HLOS for the wireless device and may interface with the OS/HLOS through a host interface. The embedded connection manager may also be independent of the applications and any user interface. The applications may be unaware of radio selections. Service continuity may be provided via the embedded connection manager in an applications-transparent fashion for improved user experience.

The embedded connection manager may be more efficient because it is located closer to the radios and is able to communicate with the radios via lower level signaling. For example, the embedded connection manager may provide the following advantages:

Selection/handoff commands for radios, including mobility management protocols such as Mobile IP, may be processed faster within the embedded connection manager, Improved selection/handoff between radios via lower level signaling and tighter radio control, Channel measurement and processing of selection/handoff commands may be handled within each radio, and Host/application processor may be in a sleep mode during selection/handoff functions to save battery power.

Figure 4:
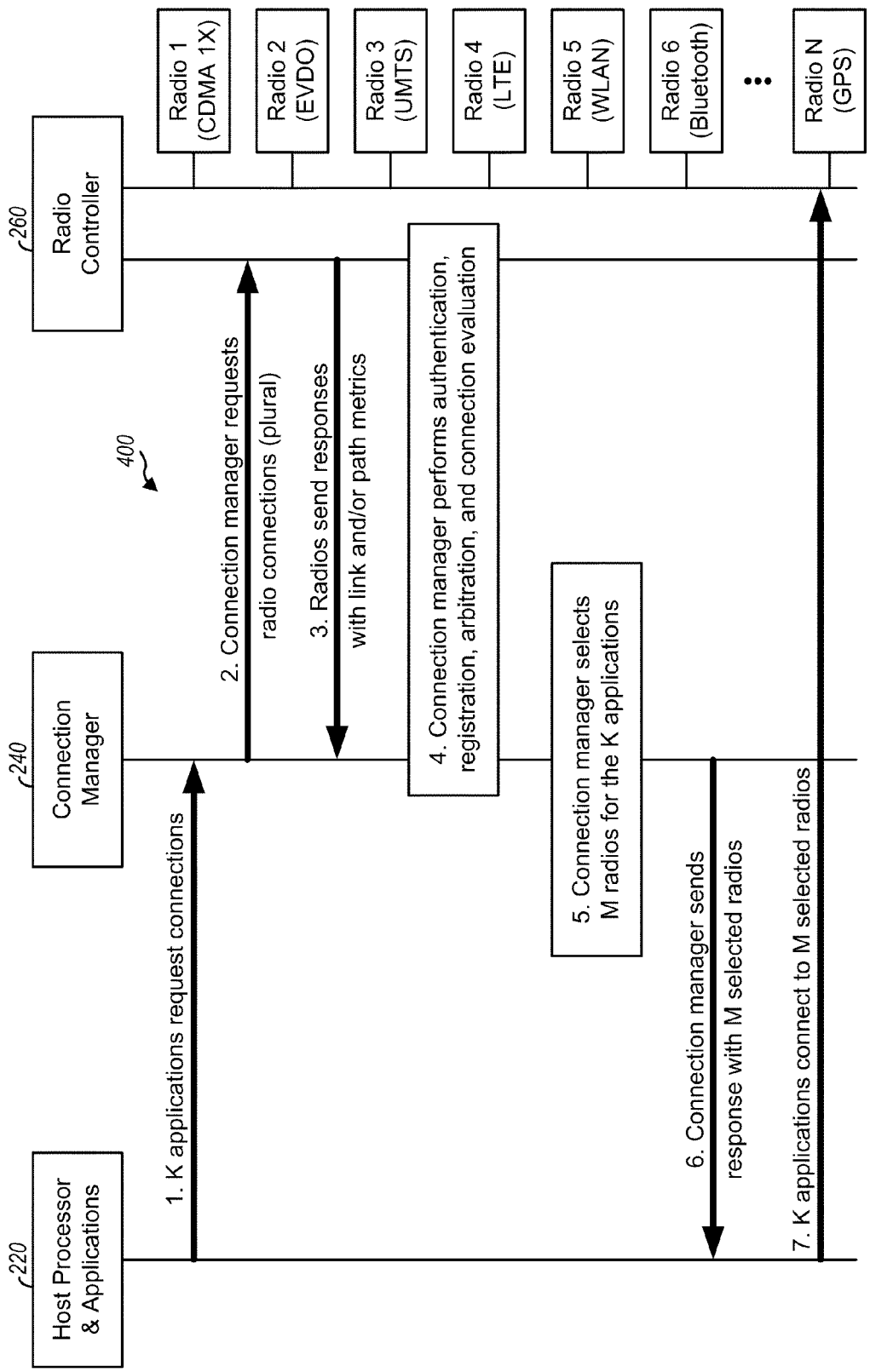
FIG. 4 shows a call flow for connection management.

FIG. 4 shows a design of a call flow 400 for connection management for wireless device 110 based on the design shown in FIG. 2. K applications may be active and may send connection requests to connection manager 240, where K≥1 (step 1). Connection manager 240 (e.g., CnM controller 242) may receive the connection requests and, in response, may send requests for radio connections to radio controller 260 (step 2). N radios 290 may be available for use and may make measurements for received signal strength indicator (RSSI), bit error rate (BER), and/or other link metrics. The available radios may send the link metrics via lower level signaling to radio controller 260, which may forward the link metrics to connection manager 240 (step 3).

Connection manager 240 may perform various functions such as authentication, registration, arbitration, and connection evaluation for the radios (step 4). Authentication may include verifying the user (e.g., password) and/or performing authentication with a wireless network to authenticate wireless device 110. Registration may include communicating with the wireless network to inform the network of the presence of wireless device 110. Arbitration may include resolving any conflict between multiple radios. Connection evaluation may include determining whether each radio has a good radio link/connection based on the RSSI, BER, and/or other link metrics. Connection evaluation may also include determining whether each radio has a good data path. A "radio link" may refer to a communication channel from a radio within wireless device 110 to a station in a wireless network, e.g., an access point in a WLAN or a base station in a cellular network. A "data path" may refer to an end-to-end communication channel from wireless device 110 (e.g., via a radio link and the Internet) all the way to an endpoint such as a server that is hosting a desired web page. Connection manager 240 may provide link metrics and/or path metrics.

In one design, connection manager 240 may select M radios to use, where $1 \leq M \leq N$ (step 5). Connection manager 240 may then send the M selected radios to the applications (step 6). In another design, connection manager 240 may determine which radios are available and may provide the available radios to the host processor. The host processor may select which radios to use from among the available radios provided by connection manager 240. In any case, the K applications may be mapped to the M selected radios based on an application-to-radio mapping, and each application may connect to its radio(s) (step 7). For example, two applications may be active, application 1 may connect to one selected radio, and application 2 may connect to another selected radio.

2. Radio Selection and Management

In general, one or more applications may be active at any given moment. Each application may have certain requirements. One or more radios may be selected to provide connectivity for the active application(s). Each radio may have certain capabilities and may provide connection for one or more active applications.

In another aspect, multiple radios may be selected to provide connectivity for one or more active applications, which may be referred to as a multi-connectivity scenario. The number of radios to select and which particular radios to select may be dependent on the capabilities of the radios and the requirements of the active application(s). The multi-connectivity scenario may provide improved performance over a single-connectivity scenario with one radio being selected for each active application.

Figure 5:
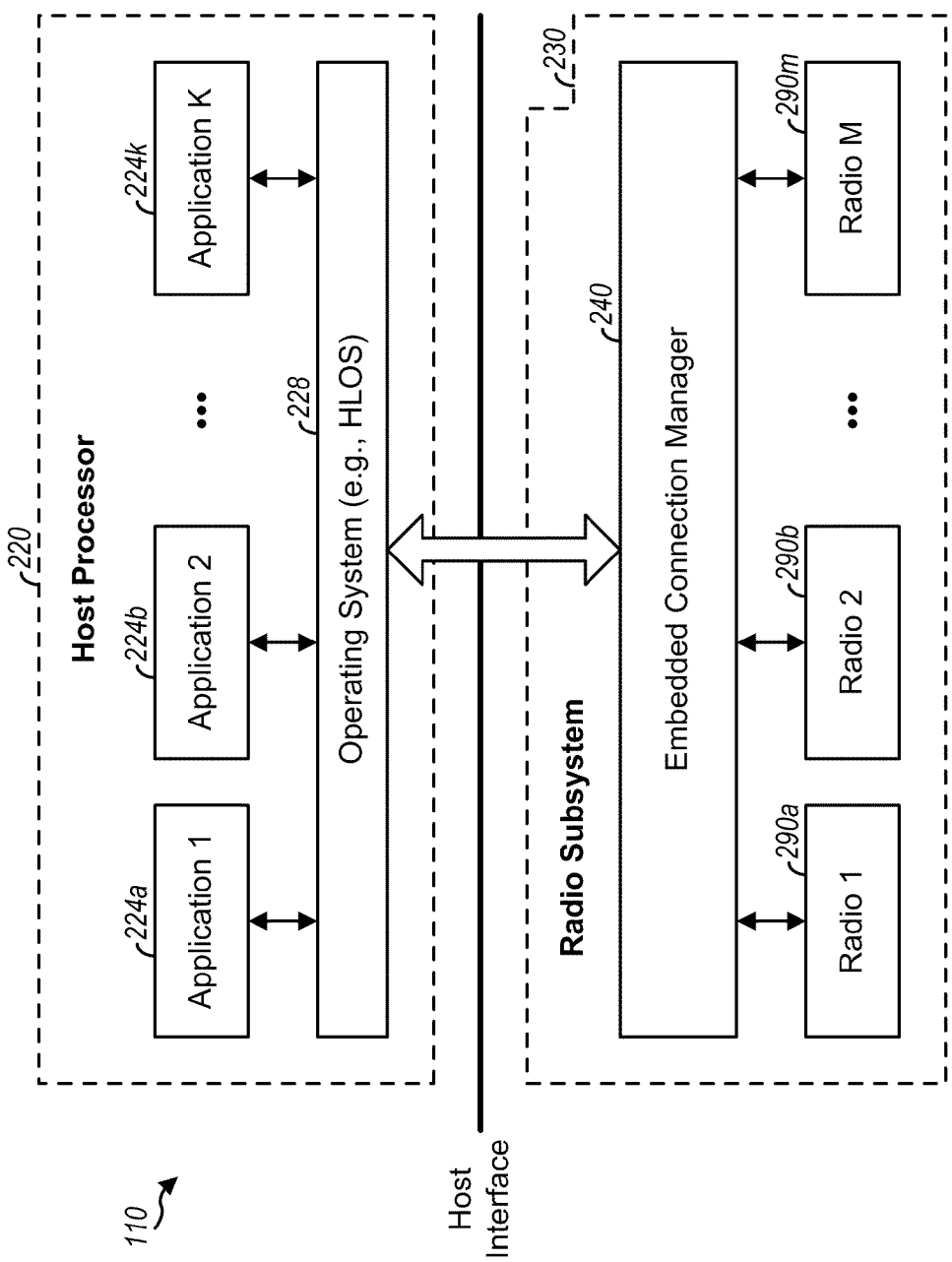
FIG. 5 shows a multi-connectivity scenario for the wireless device.

FIG. 5 shows a multi-connectivity scenario supported by connection manager 240. K applications may be active, where $K \geq 1$. The K active applications may send connection requests to connection manager 240. Connection manager 240 may determine that N radios are available for use among the R total radios in wireless device 110 and may select M of the N available radios for use, where $M > 1$ and $N > 1$. The K active applications may be mapped to the M selected radios based on the requirements of the K active applications and the capabilities of the M selected radios. Each selected radio may support a set of logical channels (or "pipes") that can provide connectivity for one or more active applications. Each active application may be mapped to one or more selected radios to obtain the desired performance for that application.

The mapping of the K active applications to the M selected radios may be static or semi-static. The mapping may be updated whenever a change is detected, e.g., due to an active application terminating, a new application becoming active, a selected radio being out of coverage, a new radio being detected, etc. The mapping may also be dynamic and may change more frequently due to handoff to support seamless mobility.

Figure 6:
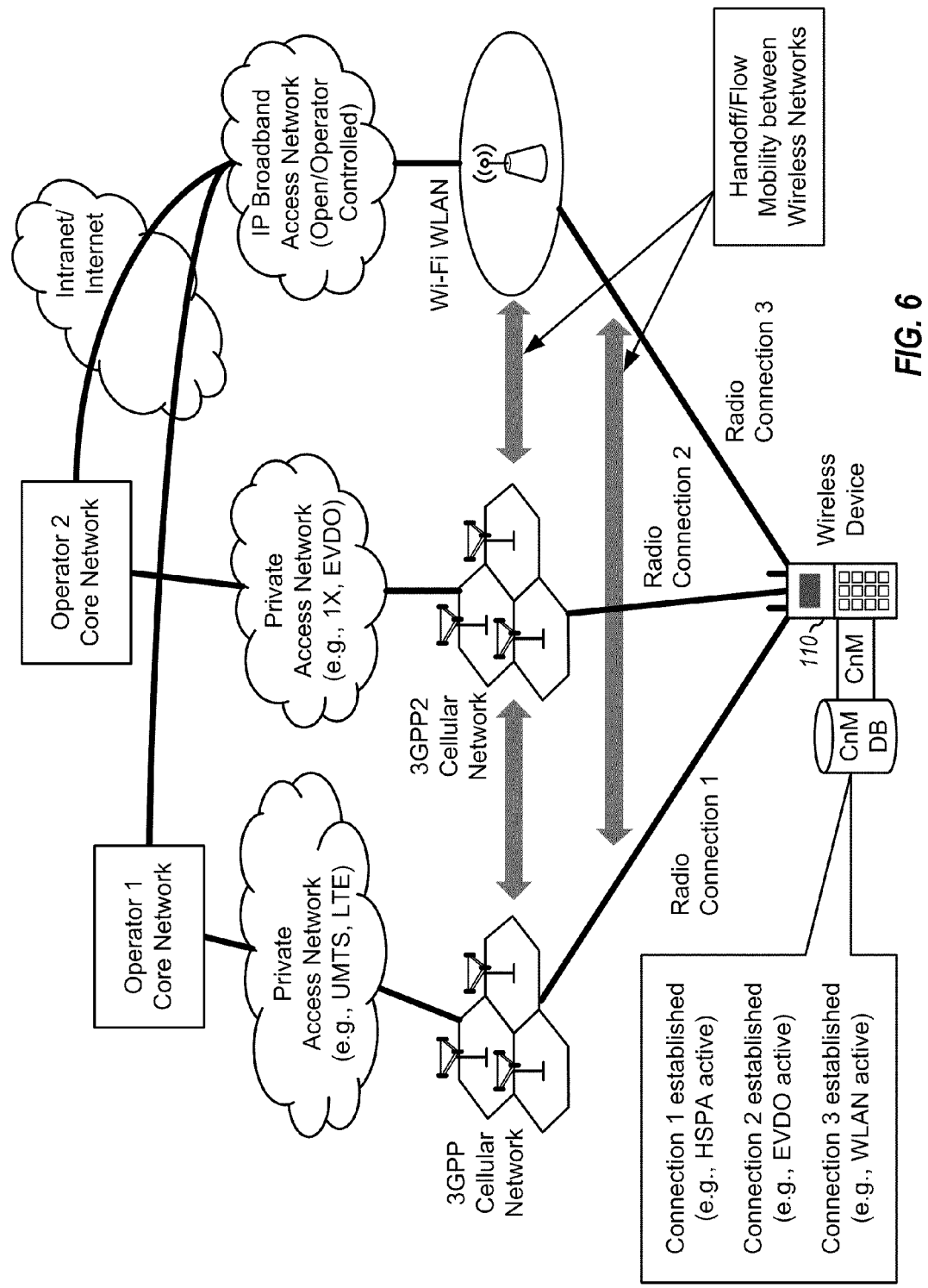
FIG. 6 shows an example of mobility management for multiple radios.

FIG. 6 shows an example of mobility management for multiple radios by connection manager 240. In this example, three radio connections 1, 2 and 3 are established to three different wireless networks. Radio connection 1 may be a High Speed Packet Access (HSPA) connection with a WCDMA network, radio connection 2 may be an EVDO connection with an EVDO network, and radio connection 3 may be a Wi-Fi connection with a WLAN. A handoff may occur between any two wireless networks due to changing radio conditions or other conditions described above.

Connection manager 240 may manage flow mobility for the K active applications. Each active application may have one or more data flows. A data flow may be described as communication or transfer of data from an application or service agent through one or more radios within a wireless device to one or more stations. A station may be an access point in a WLAN, or a base station in a cellular network, or a peer device. A peer device may connect to an access point or a base station, which may thereafter proceed to one or more communication endpoints such as an Internet server providing a web page or other information. A data flow may therefore generally be considered a "one [application] to many [radios, access points, and endpoints]" function. The data flows for the K active applications may be dynamically routed between multiple radios based on radio link quality, data requirements of the applications, congestion in the wireless networks or core networks, and/or other conditions.

An example of mobility management and flow mobility (not shown in FIG. 6) may be as follows. A user may be browsing the Internet using WLAN in a coffee shop. The user may receive a phone call and may answer the call via a CDMA 1X network, as determined by connection manager 240. A remote caller may request to show the user some information that may require a VideoShare application. The VideoShare application may be launched on an EVDO network, as determined by connection manager 240 based on an operator profile. The EVDO network may be the only wireless network of the network operator that can meet the quality requirements of the VideoShare application. The user may then have three connections to three wireless networks at this moment. The user may thereafter leave the coffee shop, and WLAN connectivity may decline. Connection manager 240 may maintain the VideoShare application on the EVDO network and may move the browser application from WLAN to the EVDO network. Connection manager 240 may thus perform handoff of the browser application from one wireless network to another wireless network. Alternatively, connection manager 240 may detect adequate WLAN connectivity and may maintain all three connections but may migrate some of the WLAN browser traffic to the EVDO network. Connection manager 240 may thus support flow mobility and may migrate an application data flow partially between two or more wireless networks.

Connection manager 240 may provide capability to enable wireless device 110 to trigger handoff from one wireless network to another wireless network. This capability may be implemented by connection manager 240 and supported by profile database 276. This capability may extend to multi-radio scenarios (e.g., 3GPP cellular to WLAN, 3GPP2 cellular to WLAN, 3GPP cellular to 3GPP2 cellular, etc.) and may include multi-operator scenarios where handoff between network operators (e.g., for different radio technologies such as 3GPP to 3GPP2) is enabled.

The example shown in FIG. 5 and the example described above are two examples in which a wireless device centric implementation of connection manager 240 may result in little impact to the wireless networks and core networks. Some mobility protocols such as Mobile IP (e.g., client-based Mobile IP implementation such as Dual Stack Mobile IP version 6 (DSMIPv6)) may be used to maintain IP (or other) connectivity when switching between networks. These may be built into the system or may be provisioned as embedded connectivity clients.

Mobility may be implemented in a variety of ways, including wireless device 110 acting autonomously, in conjunction with other wireless devices, and/or in conjunction with operator network or Internet based entities, such as Mobile IP Home Agent (HA) and Foreign Agent (FA).

3. Profiles

In another aspect, profiles may be used to provide connectivity for wireless device 110. A profile may contain preferences for specific actions that wireless device 110 should perform to obtain connectivity. For example, a profile may identify preferences for certain radios over other radios, preferences for a particular radio under certain conditions, etc. Different profiles may be defined by different entities such as a user, a network operator, an original equipment manufacturer (OEM) or wireless device manufacturer, an auxiliary service, etc. The profiles may allow for conformance to the requirements of the different entities.

Profiles may be implemented in various manners. In one design, profiles may be implemented via software programs that may be modified to suit the desired operations. In another design, profiles may be implemented via databases within wireless device 110, as described below.

A number of profiles may be defined. In one design, some or all of the following profiles may be defined:

User profile—store preferences for connectivity defined by the user,

Operator profile—store connectivity preferences defined by a network operator,

OEM profile—store connectivity preferences defined by an OEM,

Applications profile—store connectivity preferences for applications,

Services profile—store connectivity preferences for auxiliary services, and

Learned profile—store connectivity preferences determined based on learned patterns and behavior of wireless device 110.

A user profile may store preferences for connectivity defined by the user. The user may define the preferences based on various considerations such as cost, privacy, battery usage, etc. The user-defined preferences may be used to select radios to provide connectivity for applications. For example, the user profile may select a home WLAN when the user is at home, may select a company WLAN when at work, and may switch off WLAN in the car to save battery power.

An exemplary scenario for the user profile may be as follows. The user may set the user profile to invoke wireless device 110 to always use WLAN to connect from home. Wireless device 110 may then switch connectivity to WLAN whenever it determines that it is at home, e.g., based on a WLAN service set identifier (SSID), a neighbor cell tower identity (ID), GPS, etc. When WLAN-in-public is detected, wireless device 110 may prompt the user to select a wireless network. When no WLAN is detected, wireless device 110 may select a cellular network. If wireless device 110 supports both 3GPP and 3GPP2 networks, then wireless device 110 may select either 3GPP or 3GPP2 network based on user-defined preferences, which may be made anytime after purchase of wireless device 110.

An operator profile may store preferences for connectivity defined by a network operator. The network operator may prefer wireless device 110 to use some radios over other radios when several radios are available within wireless device 110. The operator preferences may be based on various considerations. For example, the network operator may prefer to route traffic data via a preferred network of the operator or to offload traffic data when an alternative access point is available, e.g., in a WLAN of the network operator. The operator preferences may be defined based on a PRL for 3GPP2 networks or a preferred PLMN list for 3GPP networks. In one design, the network operator may specify a list of preferred wireless networks. The list of preferred wireless networks may be defined as follows:

{Operator's UMTS network, Operator's WLAN, any WLAN, any WWAN}.

An exemplary scenario for the operator profile may be as follows. When wireless device 110 is powered on or is in an idle mode, it may select a cellular network based on the operator profile. When an application requests a connection, wireless device 110 may select a wireless network (e.g., a cellular network or WLAN) based on the operator profile and possibly other profiles. For example, some applications such as video telephony (VT) or VideoShare may function on only certain wireless networks. The wireless operator may offload traffic to WLAN in certain situations.

An OEM profile may store preferences for connectivity defined by an OEM or manufacturer of wireless device 110. The OEM profile may be defined based on capabilities of wireless device 110, which may be dependent on which specific radios are included in wireless device 110, the available resources in wireless device 110, etc. The available resources may be given by radio capabilities, processing capabilities (e.g., CPU MIPS), memory capacity, battery power, coders/decoders (codecs), etc. The OEM profile may store rules/preferences based on the available resources. For example, a rule may be defined as follows:

{If battery power<20%, then perform action A, else perform action B}.

Different decisions may be made based on all of the rules in the OEM profile.

The OEM profile may be defined based on tradeoffs between resource usage and speed/bandwidth to provide better user experience. For example, the user may be downloading on WLAN when a video teleconference (VT) call is started. The VT call may run on either an EVDO network or a WCDMA network. If battery power (which may be one type of resources) is low, then wireless device 110 may place the VT call on the EVDO network, may move the download to the EVDO network as well, and may shut down WLAN to save battery power. Otherwise, if battery power is high, then wireless device 110 may continue downloading on the WLAN and may connect the VT call on the EVDO network.

An applications profile may store preferences for connectivity for applications on wireless device 110. The preferences may be based on the requirements of the applications. For example, some applications may be supported by only certain wireless networks but not others. Some applications may also require certain minimum data rate for satisfactory performance. The various requirements may be captured in the applications profile, which may be used to select the proper radios to provide connectivity for the applications. For example, a given application may require a particular radio technology for connectivity, e.g., a VideoShare application may require EVDO. If another application is launched that may compromise the operation of a high priority application (such as VideoShare), then connection manager 240 may preserve the integrity of the high priority application and may route the other application elsewhere.

A services profile may store preferences for connectivity for service clients on wireless device 110. The network operator and/or other business entities may offer a collection of auxiliary services that the user can download onto wireless device 110, e.g., in similar manner as downloading of applications from an Apple App Store. Some exemplary auxiliary services are described below. An auxiliary service may operate between a service server in a network and a service client/agent in wireless device 110. The user may download the auxiliary service, which may establish the service client in wireless device 110. The operation of the auxiliary service may be governed by the services profile.

A learned profile may store preferences for connectivity determined based on past activities or behavior of wireless device 110. Patterns and behaviors of wireless device 110 may be gathered and used to create a new profile or to update an existing profile. The learned profile may also be established by local conditions such as the location of wireless device 110.

An exemplary scenario for the learned profile may be as follows. The user (a mom) may have a regular schedule of taking a child to preschool before going to work every weekday. It may take the mom 30 minutes to take the child to preschool at 7 AM, then 20 minutes to drive to work afterward. The mom may leave work at 4 PM to pick up the child and may arrive home by 5 PM. Based on this repeated pattern, wireless device 110 may create a user profile with specific actions during active time periods and may power off unused features (such as WLAN) during inactive time periods.

Six types of profiles have been described above. Fewer, different, and/or additional profiles may also be defined and used to provide connectivity.

A profile may be static and defined once, semi-static and changed once in a while, or dynamic and updated periodically or asynchronously. A profile may be updated by the user and/or other entities such as wireless device 110 via an internal learning entity, another user via a wired or wireless connection, the operator network, a service server, etc. A profile may be loaded into wireless device 110 automatically without user involvement or may require user approval for loading.

Figure 7:
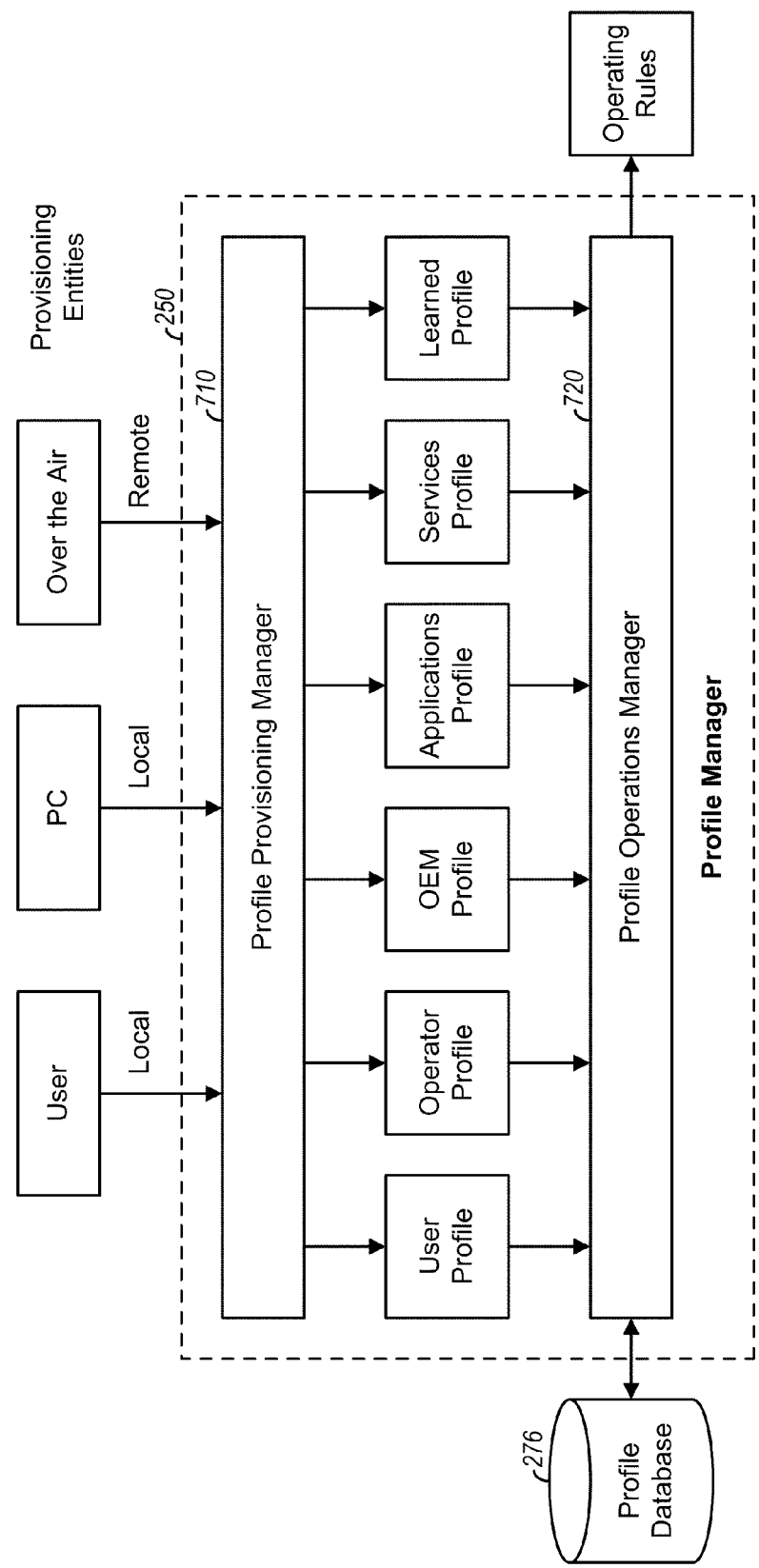
FIG. 7 shows management and use of profiles.

FIG. 7 shows a design of managing and using profiles for radio selection. Profile manager 250 within connection manager 240 may create or update profiles based on inputs from various entities. Profile manager 250 may also generate operating rules based on applicable profiles, e.g., whenever a connection request is received. The operating rules may be used to provide connectivity for active applications.

Within profile manager 250, a profile provisioning manager 710 may receive inputs from one or more entities to create profiles and/or to update profiles. For example, manager 710 may receive (i) user inputs via a local mechanism such as a keyboard or a touch screen on wireless device 110, (ii) local inputs via a local mechanism such as a PC through a wired connection (e.g., USB) or a wireless connection (e.g., Bluetooth or WLAN), or (iii) over-the-air (OTA) inputs from the operator network or a service server via a one-way mechanism such as short message service (SMS), a two-way mechanism such as Open Mobile Alliance Device Management (OMA DM), etc. Manager 710 may also receive other inputs from wireless device 110 itself and may use these inputs to update profiles, e.g., the learned profile. In general, manager 710 may receive information used to create or update profiles from external entities or wireless device 110. Manager 710 may create or update the profiles based on the received information. Profile database 276 may store the profiles for wireless device 110.

A profile operations manager 720 may receive one or more applicable profiles from database 276, e.g., when a connection request is received. For example, the applicable profile(s) may be dynamically selected based on environment, location, or some other predefined and/or learned criteria. Manager 720 may determine the priorities of the applicable profile(s) and may arbitrate between conflicting profiles as necessary. The priorities of the profiles may be determined (e.g., locally) based on an algorithm, which may be implemented with embedded logic or software. The priorities of the profiles may also be updated via profile provisioning manager 710. Manager 720 may determine operating rules for wireless device 110 based on the applicable profile(s) and further in accordance with an algorithm. The operating rules may be used to select radios, to map active applications to the selected radios, etc. The profile database and the algorithms for managing and/or using the profiles may be updated by external entities, which may or may not be the same entities that can create and update the profiles.

Profile database 276 may store profiles that can control the operation of wireless device 110 and may be maintained within wireless device 110, as shown in FIGS. 2 and 7. Profile database 276 may also be mirrored and stored on an external entity such as a service server. Storing the profile database externally may provide certain benefits. For example, the externally stored profile database may enable backup, may allow for modification by the user and/or an external entity via Internet access (such as from a fixed or mobile device, or from a management entity), and may allow for sharing among a defined user community.

The profiles may control connectivity for applications and services, as described above. The profiles may also control other features. For example, the profiles may be used to control push services update, e.g., to determine when applications or services should be downloaded onto wireless device 110. The profiles may also be used to control power consumption, e.g., to determine how power management should be performed within wireless device 110.

Wireless device 110 may have capability to communicate (e.g., via a wired or wireless link) with an external entity to establish a new kind of connectivity and options. However, if no or insufficient communication with the external entity is available, then wireless device 110 may operate based on (i) existing information within the wireless device, which may be provided by the OEM or seller of the wireless device, or (ii) the last sufficient communication with the external entity, which may be the network operator, a business entity, etc.

4. Auxiliary Services

As noted above, a collection of auxiliary services may be offered by the network operator and/or other business entities and may be downloaded onto wireless device 110. Each auxiliary service may be associated with a service server on the network side and a service client on wireless device 110. The service client may communicate with the service server in order to obtain the associated auxiliary service. Wireless device 110 may have any number of service clients for any number of auxiliary services. Each service client on wireless device 110 may be executed (e.g., in accordance with the services profile) to obtain the associated auxiliary service. Various auxiliary services may be supported, and some examples are described below.

An exemplary auxiliary service may be for Wi-Fi hotspot identification with authentication. The auxiliary service may download onto wireless device 110 a list of Wi-Fi hotspots and authentication credentials. The download may be triggered based on the location of wireless device 110, the time of day, user request, etc. The service client may receive and process the downloaded information and may establish a specific connection based on the downloaded information. The service client and the service server may jointly maintain various parameters associated with the connection, such as billing, type of transactions, issues with the connection (e.g., number of tries needed to connect), etc.

Another exemplary auxiliary service may be for connectivity auction client. Airtime on cellular networks may be sold or auctioned in small time increments to users. A connectivity auction service may be able to find the cheapest and/or best connectivity method, e.g., on a 3GPP cellular network, a 3GPP2 cellular network, or WLAN. Wireless device 110 may download the connectivity auction service and may invoke the service, as necessary, to obtain the cheapest and/or best connectivity. For example, wireless device 110 may run this service when roaming, or when the user requests a communication service that is not offered by the network operator, etc.

In one design, a service client may communicate with an associated service server for a particular auxiliary service. In another design, a service client may communicate with multiple service servers to obtain connectivity information for different wireless networks. The service client may aggregate the connectivity information received from all service servers and may determine one or more wireless networks to access based on the aggregated connectivity information.

The service servers for the auxiliary services may reside in one or more networks. The service servers may provide functionality to assist connection manager 240 to provide connectivity for wireless device 110.

Figure 8:
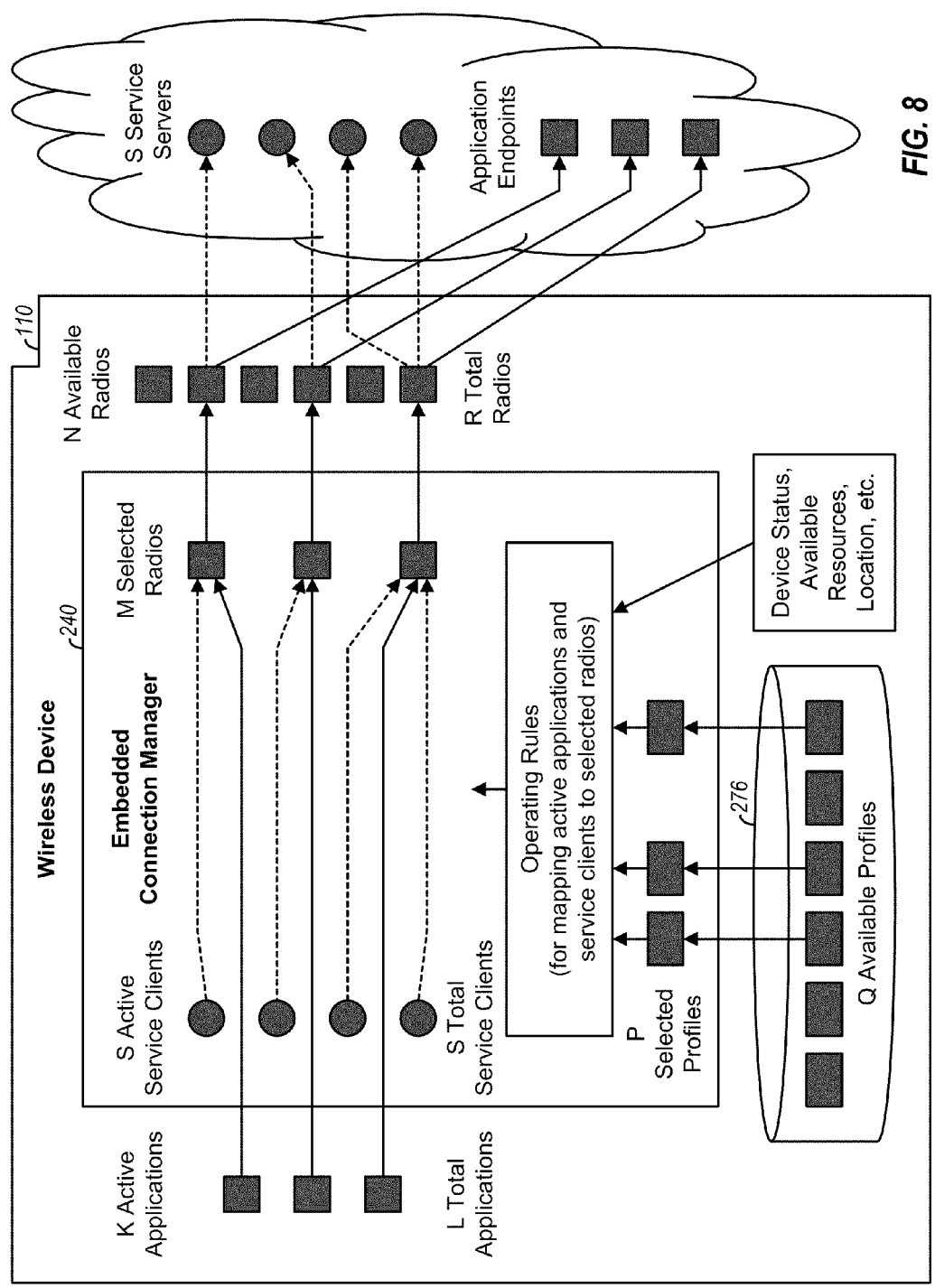
FIG. 8 shows operation of a connection manager to provide connectivity.

FIG. 8 shows the operation of connection manager 240 to support connectivity for applications and service clients. K applications may be active among L total applications, where K≥1. S service clients may also be active among T total service clients, where S≥1.

Connection manager 240 may receive one or more connection requests from the K active applications and the S active service clients. Connection manager 240 may determine that P profiles are applicable among the Q total profiles, where P and Q may be any values. Connection manager 240 may also receive information indicative of the operating state, the available resources, and/or the location of wireless device 110. Connection manager 240 may determine operating rules based on the P selected profiles and the received information for wireless device 110.

Connection manager 240 may determine that N radios are available for use among the R total radios, where N>1. Connection manager 240 may select M of the N available radios to provide connectivity for the K active applications and the S active service clients, where M≥1. Connection manager 240 may then map the K active applications and the S active service clients to the M selected radios based on the operating rules. In the example shown in FIG. 8, one active application and one active service client may be mapped to one selected radio, another active application and another active service client may be mapped to another selected radio, and yet another active application and two active service clients may be mapped to the last selected radios based on the operating rules. Each active service client may communicate with its associated service server. Each active application may communicate with any entity to obtain the desired communication service. In FIG. 8, the dashed lines indicate the flow of the auxiliary services (service clients and service servers), whereas the solid lines indicate the flow of the active applications. The endpoints for both auxiliary services and applications are shown in the 'cloud', which may be the Internet.

The active applications and/or the active service clients may change. Furthermore, one or more selected radios may no longer be available (e.g., due to mobility) and/or other radios may become available or may be more preferred. Connection manager 240 may update the selected radios, as needed, due to changes in the active applications, the active service clients, the available radios, the applicable profiles, the device operating state, the available resources, and/or other factors.

5. Operating Pillars

Wireless device 110 may obtain connectivity via one or more of the following:

Basic connectivity—connectivity through wireless networks,

Extended connectivity—connectivity through peer-to-peer communication, and

Auxiliary services—connectivity through network assistance.

In general, wireless device 110 may include radios, drivers, protocol stacks, middleware, applications, reference hardware, etc. Connection manager 240 may unite the radios to provide improved communication services while hiding complexity from the user. Connection manager 240 may provide intelligent management of the radios, perform system selection, handle connection continuity and/or handoff, control configuration of options, etc. Connection manager 240 may also support peer-to-peer applications and auxiliary services. The auxiliary services may allow for provisioning of wireless device 110 from a network server for network management and services management.

For basic connectivity, connection manager 240 may support system selection, handoff between different wireless networks, and radio on/off management. For system selection, connection manager 240 may select the best available wireless networks based on applicable profiles. System selection may enable the active applications to have the best connectivity using the radios that best suit the communication needs of the user, whether the user is at home, at work, in public, etc. For handoff, connection manager 240 may handle handoff from cellular networks to WLAN (e.g., based on the profiles) for voice, data, etc. Connection manager 240 may also handle handoff from cellular networks to cellular networks for voice, data, etc. Connection manager 240 may also ensure service continuity in an active mode (with applications running) when switching between different domains, e.g., circuit-switched and packet-switched domains. Connection manager 240 may also perform system reselection in an idle mode (with no applications running) and may perform registration, association, and authentication, as needed. Connection manager 240 may also perform system selection and/or acquisition for system loss. For radio on/off management, connection manager 240 may turn radios on or off intelligently to save battery power while providing the desired performance.

For extended connectivity, connection manager 240 may support peer-to-peer communication, which may be defined as communication between wireless devices with or without infrastructure equipment. Some examples of infrastructureless peer-to-peer communication may include Infrared Data Association (IrDA) and Bluetooth. Some examples of infrastructure-based peer-to-peer communication include WLAN (via an access point) and cellular (via network entities). A service server may serve as an intermediary for peer-to-peer connectivity.

Connection manager 240 may also support extended reachability (or extended peer-to-peer) for direct communication with wireless devices beyond the local link. Extended reachability may enable device-to-device communication across wireless networks and sub-networks, and applications may be unaware of intermediate nodes in the networks. For example, wireless device 110 may communicate with a device in the user's home for remote PC control and may be able to reach this device beyond a WLAN Access Point with Network Address Translation (AP/NAT/firewall). Connection manager 240 may also support peer-to-multi-peer or multi-peer-to-multi-peer communication. The algorithms to enable extended reachability may be provided via service clients in connection manager 240, and the services clients may communicate with service servers for provisioning and maintenance. An exemplary protocol is Interactive Connectivity Establishment (ICE), which specifics a methodology to carry out communications across networks.

Figure 9:
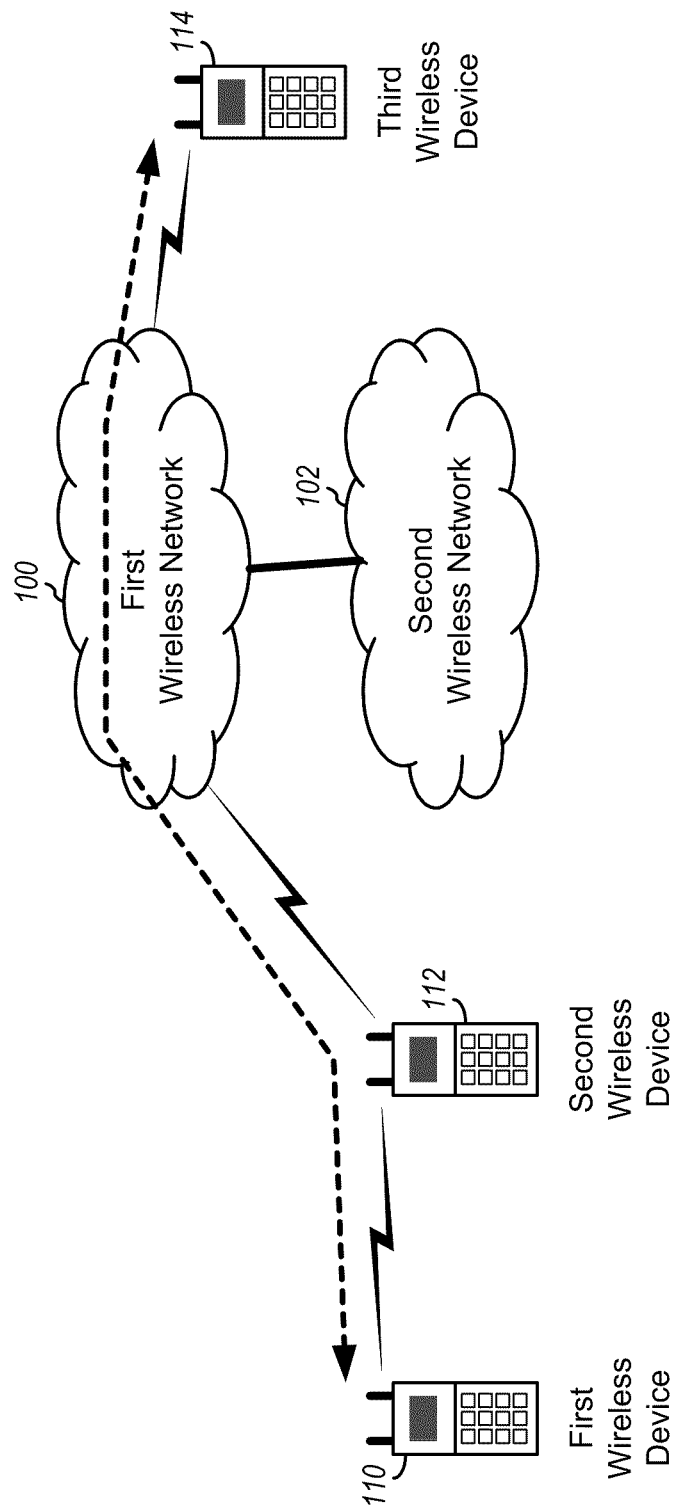
FIG. 9 shows an example of extended reachability for the wireless device.

FIG. 9 shows an example of extended reachability for wireless device 110. Wireless device 110 may communicate peer-to-peer with another wireless device 112 for communication with a first wireless network 100, a second wireless network 102, or a third wireless device 114. Wireless device 112 may act as an intermediary to support communication by wireless device 110. Connection manager 240 within wireless device 110 may communicate with wireless device 112 to determine which radios on wireless device 112 are available for use. Connection manager 240 may select one or more radios available on wireless device 112 for use and may map the active applications on wireless device 110 to the selected radio(s) on wireless device 112.

Wireless device 112 may function more than a wireless gateway that simply bridges incoming communications to outgoing communications. In particular, wireless device 112 may be a multi-radio device with both incoming and outgoing traffic flows. Wireless device 112 may support multiple radios (e.g., for WCDMA, EVDO, LTE, WLAN, etc.) and may route incoming communications to one of several possible cellular networks such as a WCDMA network, an EVDO network, an LTE network, etc. Wireless device 112 may also be capable of running its own applications, possibly while supporting the pass-through connection from wireless device 110. Wireless device 112 may thus be more than a simple wireless gateway and may have capabilities similar to those of wireless device 110.

Wireless network 100 may be a serving network for wireless device 112. Wireless network 102 may be a home network for wireless device 110. Wireless device 110 may communicate with wireless network 100 via wireless device 112, e.g., for communication with wireless device 114 or some other entity. Wireless device 110 may also communicate with wireless network 102 via wireless device 112, e.g., to download configuration information such as profiles, a PRL, a preferred PLMN list, etc.

For auxiliary services, wireless device 110 may be provisioned with auxiliary services by service servers via wireless and/or wireline. The auxiliary services may support end-to-end network management, services/subscriber management, push software updates/applications, etc.

The embedded connection manager described herein may provide various advantages. The connection manager may provide increased chipset functionality, which may allow for a more competitive OEM offering and quicker time to market. The connection manager may support profile-driven connectivity, e.g., system selection based on rules for applications, available resources, handoff, etc. The profiles may be field updateable, self-learning, and/or shareable. The profiles may simplify development of applications related to the connection manager, since a profile may be changed instead of rewriting an application. The profiles may also enable operator connection management services for dynamic profile maintenance and control.

The connection manager may support both open and cellular-controlled WLAN access types. The connection manager may enable future cell/cell system selection and handoffs. The connection manager may provide improved performance due to algorithms and tighter radio control, including cell-cell operation and coexistence. This may result in (i) improved system selection (e.g., including more choices via multi cellular options), (ii) improved cell/WLAN handoffs, (iii) a common connection manager platform for advanced capabilities and services, and (iv) support for extended reachability and future extended personal area network (PAN) and peer-to-peer communication.

For clarity, connection manager 240 capable of controlling multiple radios 290 in wireless device 110 has been described above. A connection manager may also be used for a wired device, which may support wired communication via different wired radio technologies. For example, the wired device may include a telephone or DSL modem for communication via a telephone line, a cable modem for communication via cable, etc. The wired radios in wired device may be controlled in similar manner as the wireless radios in wireless device 110. A connection manager may also be used for a hybrid device that includes both wireless and wired radios.

Figures 10, 11:
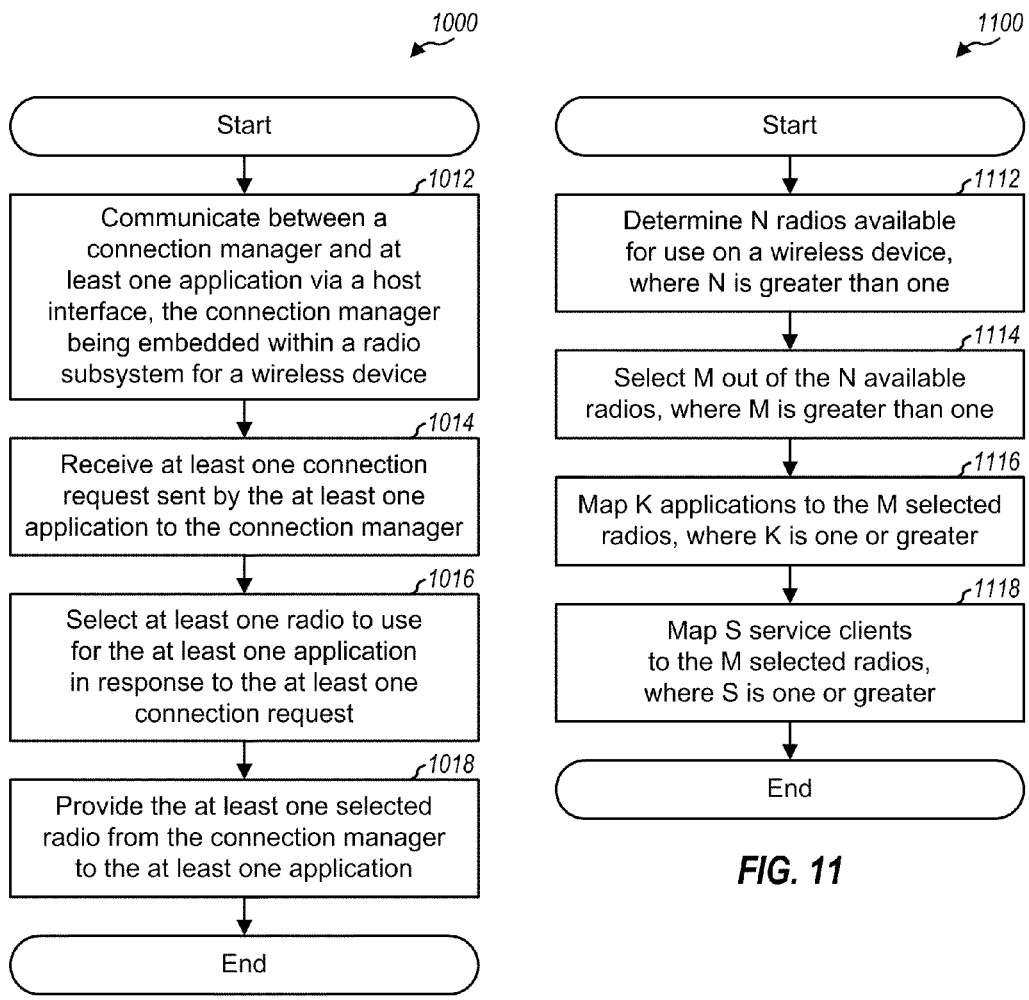
FIG. 10 shows a process for supporting communication for a wireless device.
FIG. 11 shows a process for supporting communication using multiple radios.

FIG. 10 shows a design of a process 1000 for supporting communication for a wireless device. Process 1000 may be performed by a connection manager within the wireless device. The connection manager may be embedded within a radio subsystem for the wireless device and may operate below and independently of an operating system (or an application in conjunction with the operating system) for the wireless device, e.g., as shown in FIG. 2. The radio subsystem may comprise a wireless data card, a modem chip, a modem chipset, etc. The connection manager may communicate with at least one application via a host interface between the radio subsystem and the operating system (block 1012). The connection manager may receive at least one connection request sent by the at least one application (block 1014).

The connection manager may select at least one radio to use for the at least one application in response to the at least one connection request (block 1016). In one design, the connection manager may communicate with a radio controller to obtain measurements for available radios. The connection manager may determine the quality of a plurality of radio links, with each radio link corresponding to a communication channel from an available radio on the wireless device to a station in a wireless network. The connection manager may also determine the quality of a plurality of data paths, with each data path corresponding to an end-to-end communication channel via an available radio on the wireless device to an endpoint transferring data with the wireless device. The connection manager may also communicate with one or more wireless networks for authentication, registration, etc. The connection manager may select the at least one radio based on the measurements for the available radios, the quality of the plurality of radio links, the quality of the plurality of data paths, and possibly other factors. In one design, the connection manager may determine the capabilities of the available radios and the requirements of the at least one application. The connection manager may then select the at least one radio from among the available radios based on the capabilities of the available radios and the requirements of the at least one application. In one design, the connection manager may determine a set of radios available for use and may select a subset of the available radios as the at least one selected radio. In another design, the connection manager may determine a set of radios available for use and may provide this set of available radios as the at least one selected radio. In any case, the connection manager may provide the at least one selected radio to the at least one application (block 1018).

FIG. 11 shows a design of a process 1100 for supporting communication for a wireless device using multiple radios. N radios available for use on the wireless device may be determined, where N is greater than one (block 1112). M out of the N available radios may be selected for use, where M is greater than one (block 1114). K applications may be mapped to the M selected radios, where K may be one or greater (block 1116). Each application may be mapped to one or more selected radios, and each selected radio may support one or more applications. S service clients may also be mapped to the M selected radios, where S may be one or greater (block 1118). Each service client may communicate with an associated service server via an associated radio.

In one design, changes in available radios on the wireless device due to user mobility, network availability, and/or factors may be detected. Blocks 1112 to 1118 may be repeated if changes in available radios are detected. In another design, changes in active applications may be detected. The changes may be due to changes in requirements of the active applications, termination of one or more of active applications, launching of one or more additional applications, etc. Block 1116 may be repeated if changes in the active applications are detected. Alternatively, blocks 1112, 1114 and 1116 may be repeated if changes in the active applications are detected. In yet another design, changes in operating state of the wireless device and/or available resources for the wireless device may be detected. Blocks 1112 to 1118 may be repeated if changes in the operating state and/or available resources are detected. In general, changes in any parameter affecting the mapping of applications and/or service clients to radios may be detected. Blocks 1112, 1114, 1116 and/or 1118 may then be performed in response to the detected changes.

Figures 12, 13:
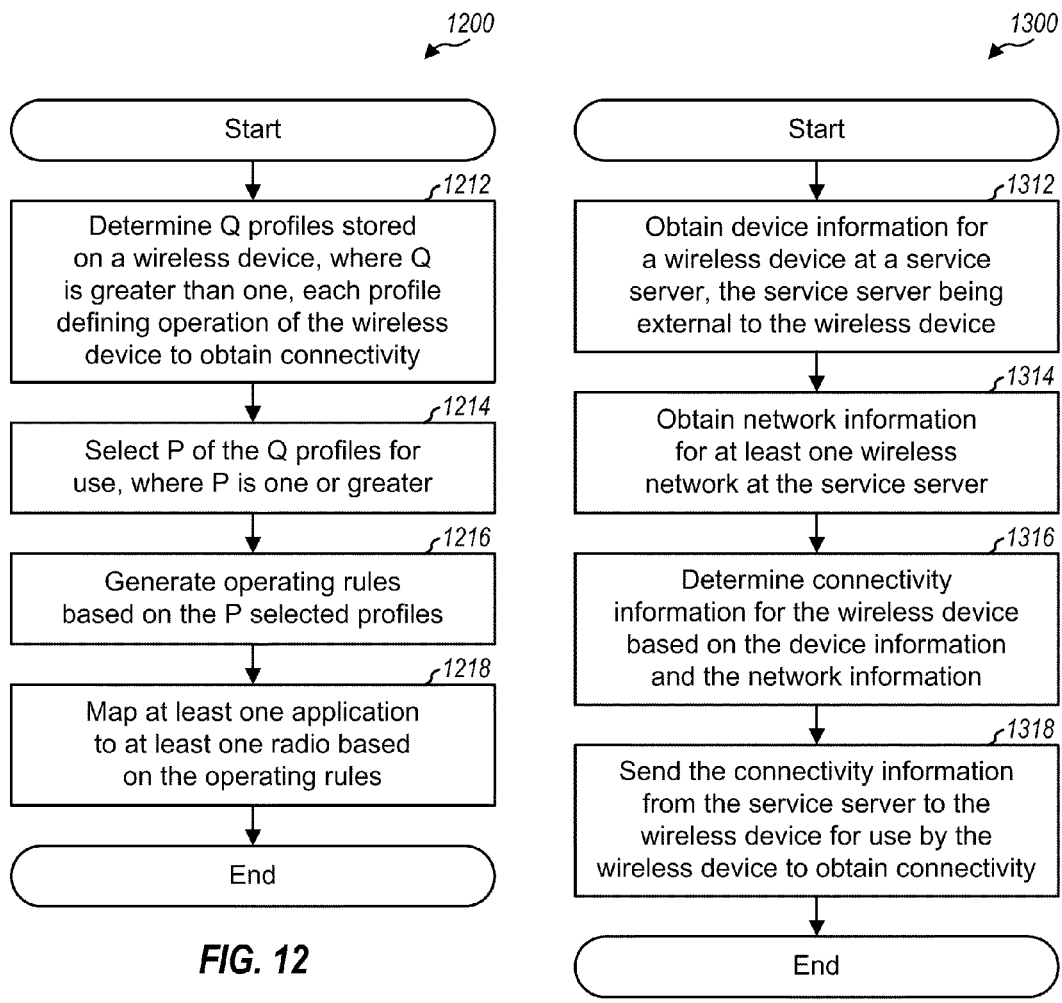
FIG. 12 shows a process for supporting communication using profiles.
FIG. 13 shows a process for supporting communication by a service server.

FIG. 12 shows a design of a process 1200 for supporting communication for a wireless device using profiles. Q profiles stored on the wireless device may be determined, where Q is greater than one (block 1212). Each profile may define the operation of the wireless device to obtain connectivity. The Q profiles may comprise (i) a user profile storing preferences for connectivity defined by a user of the wireless device, (ii) an operator profile storing preferences for connectivity defined by a network operator, (iii) an OEM profile storing preferences for connectivity defined by an OEM, (iv) an applications profile storing preferences for connectivity for applications on the wireless device, (v) a services profile storing preferences for connectivity for service clients on the wireless device, (vi) a learned profile storing preferences for connectivity determined based on past activities or behavior of the wireless device, and/or (vii) other profiles. The profiles may be created and/or updated based on user inputs, network operator inputs, external inputs, wireless device inputs, etc. The profiles may also be exchanged with a network entity (e.g., a service server) or another wireless device.

P of the Q profiles may be selected for use, where P is one or greater (block 1214). The P profiles may be selected based on the active applications, the available radios, user habits, the location of the wireless device, and/or other information. Operating rules may be generated based on the P selected profiles (block 1216). P may be greater than one, and the multiple profiles may operate simultaneously to generate the operating rules. At least one application may be mapped to at least one radio based on the operating rules (block 1218).

FIG. 13 shows a design of a process 1300 for supporting communication for a wireless device. Process 1300 may be performed by a service server residing in a network. The service server may obtain device information for the wireless device, which may comprise the location of the wireless device, the capabilities of the wireless device, etc. (block 1312). The service server may also obtain network information for at least one wireless network, which may comprise the cost of each wireless network, the availability of each wireless network, etc. (block 1314). The service server may determine connectivity information for the wireless device based on the device information and the network information (block 1316). The connectivity information may indicate one or more wireless networks selected for the wireless device, authentication information used to access the one or more selected wireless networks, etc. The service server may send the connectivity information to the wireless device for use by the wireless device to obtain connectivity (block 1318).

Figure 14:
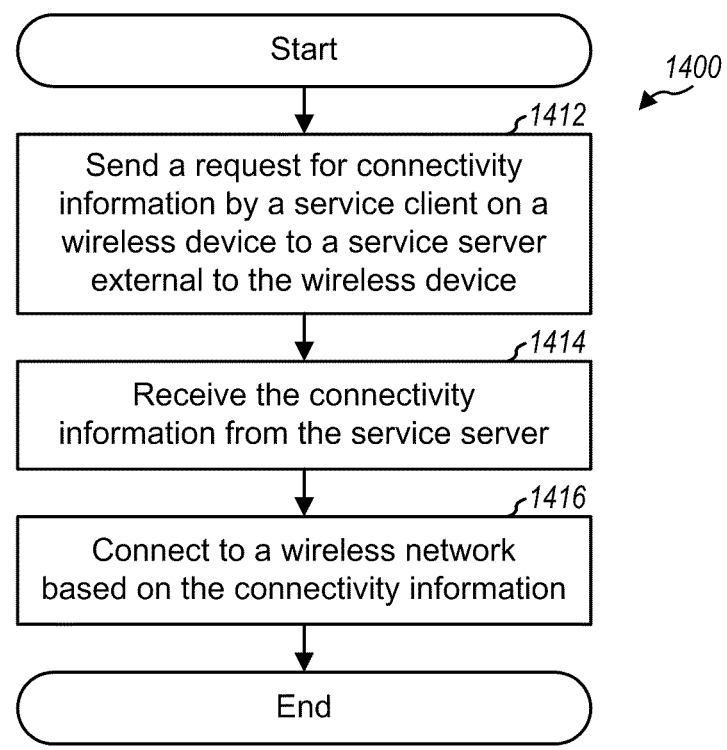
FIG. 14 shows a process for supporting communication by a service client.

FIG. 14 shows a design of a process 1400 for supporting communication for a wireless device. Process 1400 may be performed by a service client residing on the wireless device. The service client may send a request for connectivity information to a service server that is external to the wireless device (block 1412). The request may include device information comprising the location of the wireless device, the capabilities of the wireless device, etc. The service client may receive the connectivity information from the service server (block 1414). The connectivity information may be determined by the service server based on the device information and possibly other information obtained by the service server. The connectivity information may include one or more wireless networks selected for the wireless device, authentication information used to access the selected wireless network(s), etc. The wireless device may select a wireless network to access from among the selected wireless network(s). The wireless device may then connect to the wireless network based on the connectivity information (block 1416). The wireless device may also perform authentication with the wireless network based on the authentication information.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Headings are included herein for reference and to aid in locating certain sections. These headings are not intended to limit the scope of the concepts described therein under, and these concepts may have applicability in other sections throughout the entire specification.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of supporting communication, comprising:
   communicating between a connection manager and at least one application via a host interface, the connection manager being embedded within a radio subsystem for a wireless device, the wireless device comprising at least one profile including connectivity preferences for the wireless device;
   receiving at least one connection request sent by the at least one application to the connection manager, the at least one connection request configured to trigger use of the at least one profile;
   selecting, using the connection manager, at least one radio from a plurality of radios to use for the at least one application in response to the at least one connection request based on operating factors of the plurality of radios; and
   providing the at least one selected radio from the connection manager to the at least one application.

2. The method of claim 1, wherein the selecting at least one radio comprises
   determining a set of radios available for use, and
   selecting a subset of the available radios as the at least one selected radio.

3. The method of claim 1, wherein the selecting at least one radio comprises
   determining a set of radios available for use, and
   providing the set of available radios as the at least one selected radio.

4. The method of claim 1, wherein the selecting at least one radio comprises communicating with a radio controller to obtain measurements for available radios, and selection the at least one radio based on the measurements for the available radios.

5. The method of claim 4, wherein the selecting at least one radio comprises
   determining quality of a plurality of radio links, each radio link corresponding to a communication channel from an available radio on the wireless device to a station in a wireless network, and
   selecting the at least one radio based on the quality of the plurality of radio links.

6. The method of claim 4, wherein the selecting at least one radio comprises
   determining quality of a plurality of data paths, each data path corresponding to an end-to-end communication channel via an available radio on the wireless device to an endpoint transferring data with the wireless device, and
   selecting the at least one radio based on the quality of the plurality of data paths.

7. The method of claim 1, wherein the selecting at least one radio comprises
   determining capabilities of radios available for use, and selecting the at least one radio from among the available radios based on the capabilities of the available radios and requirements of the at least one application.

8. The method of claim 1, further comprising:
communicating between the connection manager and a wireless network for authentication, or registration, or both.

9. The method of claim 1, wherein the radio subsystem comprises a wireless data card, a modem chip, or a modem chipset.

10. The method of claim 1, wherein the connection manager operates below and independently of an operating system on the wireless device.

11. An apparatus for supporting communication, comprising:
means for communicating between a connection manager and at least one application via a host interface, the connection manager being embedded within a radio subsystem for a wireless device, the wireless device comprising at least one profile including connectivity preferences for the wireless device;
means for receiving at least one connection request sent by the at least one application to the connection manager, the at least one connection request configured to trigger the use of the at least one profile;
means for selecting, using the connection manager, at least one radio from a plurality of radios to use for the at least one application in response to the at least one connection request based on operating factors of the plurality of radios; and
means for providing the at least one selected radio from the connection manager to the at least one application.

12. The apparatus of claim 11, wherein the means for selecting at least one radio comprises
means for determining a set of radios available for use, and
means for selecting a subset of the available radios as the at least one selected radio.

13. The apparatus of claim 11, wherein the means for selecting at least one radio comprises
means for determining a set of radios available for use, and
means for providing the set of available radios as the at least one selected radio.

14. The apparatus of claim 11, wherein the means for selecting at least one radio comprises
means for determining quality of a plurality of radio links, each radio link corresponding to a communication channel from an available radio on the wireless device to a station in a wireless network, and
means for selecting the at least one radio based on the quality of the plurality of radio links.

15. An apparatus for supporting communication, comprising:
at least one processor configured
to communicate between a connection manager and at least one application via a host interface, the connection manager being embedded within a radio subsystem for a wireless device, the wireless device comprising at least one profile including connectivity preferences for the wireless device,
to receive at least one connection request sent by the at least one application to the connection manager, the at least one connection request configured to trigger the use of the at least one profile,
to select, using the connection manager, at least one radio from a plurality of radios to use for the at least one application in response to the at least one connection request based on operating factors of the plurality of radios, and
to provide the at least one selected radio from the connection manager to the at least one application.

16. The apparatus of claim 15, wherein the at least one processor is configured to determine a set of radios available for use and to select a subset of the available radios as the at least one selected radio.

17. The apparatus of claim 15, wherein the at least one processor is configured to determine a set of radios available for use and to provide the set of available radios as the at least one selected radio.

18. The apparatus of claim 15, wherein the at least one processor is configured to determine quality of a plurality of radio links, each radio link corresponding to a communication channel from an available radio on the wireless device to a station in a wireless network, and to select the at least one radio based on the quality of the plurality of radio links.

19. A computer program product, comprising:
a non-transitory computer-readable medium comprising:
code for causing at least one computer to communicate between a connection manager and at least one application via a host interface, the connection manager being embedded within a radio subsystem for a wireless device, the wireless device comprising at least one profile including connectivity preferences for the wireless device,
code for causing the at least one computer to receive at least one connection request sent by the at least one application to the connection manager, the at least one connection request configured to trigger the use of the at least one profile,
code for causing the at least one computer, using the connection manager, to select at least one radio from a plurality of radios to use for the at least one application in response to the at least one connection request based on operating factors of the plurality of radios, and
code for causing the at least one computer to provide the at least one selected radio from the connection manager to the at least one application.

\* \* \* \* \*